US012703066B2

(12) United States Patent
Geissele et al.

(10) Patent No.: US 12,703,066 B2
(45) Date of Patent: Aug. 11, 2026

(54) SUPPRESSOR ASSEMBLY, TOOLSET, AND METHODS FOR ASSEMBLING AND DISASSEMBLING

(71) Applicant: WHG PROPERTIES, LLC, North Wales, PA (US)

(72) Inventors: William H. Geissele, Lower Gwynedd, PA (US); Frank E. Robinson, Schwenksville, PA (US)

(73) Assignee: WHG PROPERTIES, LLC, North Wales, PA (US)

(*) Notice: Subject to any disclaimer, the term of this patent is extended or adjusted under 35 U.S.C. 154(b) by 398 days.

(21) Appl. No.: 18/310,798

(22) Filed: May 2, 2023

(65) Prior Publication Data

US 2024/0367294 A1 Nov. 7, 2024

(51) Int. Cl.

| | |
|---|---|
| ***F41A 21/30*** | (2006.01) |
| ***B25B 13/46*** | (2006.01) |
| ***B25B 13/50*** | (2006.01) |

(52) U.S. Cl.
CPC ........ *B25B 13/5016* (2013.01); *B25B 13/463* (2013.01); *F41A 21/30* (2013.01)

(58) Field of Classification Search
CPC .... F41A 21/30; B25B 13/5016; B25B 13/463
See application file for complete search history.

(56) References Cited

U.S. PATENT DOCUMENTS

| | | | |
|---|---|---|---|
| 1,066,898 | A | 7/1913 | Gray |
| 5,247,715 | A | 9/1993 | Nishiguchi |
| 6,575,074 | B1 | 6/2003 | Gaddini |
| 7,587,969 | B2 | 9/2009 | Silvers |
| 7,856,914 | B2 | 12/2010 | Shults et al. |
| 8,100,224 | B1 | 1/2012 | Olson |
| 8,171,840 | B2 | 5/2012 | Kline et al. |
| D666,883 | S | 9/2012 | Howard et al. |
| 8,453,789 | B1 | 6/2013 | Honigmann et al. |
| 8,511,425 | B2 | 8/2013 | Larue |
| 8,516,941 | B1 | 8/2013 | Oliver |
| 8,739,922 | B2 | 6/2014 | Wirth et al. |
| 8,967,325 | B1 | 3/2015 | Cronhelm |
| 8,973,481 | B2 | 3/2015 | Dueck et al. |
| 9,052,152 | B2 | 6/2015 | Moss et al. |
| 9,182,187 | B1 | 11/2015 | Griffith |

(Continued)

OTHER PUBLICATIONS https://www.alamy.com/stock-photo-ring-spanner-on-workbench-of-tools-used-in-engineering-workshop-engine-50861176.html (Year: 2012).*

*Primary Examiner* — Moshe Wilensky
(74) *Attorney, Agent, or Firm* — Alston & Bird LLP

(57) ABSTRACT

Assemblies, suppressor assemblies, firearms, tool sets, methods, and/or the like are provided. In some embodiments, a tool set for assembling and/or disassembling a suppressor assembly may include a first wrench and a second wrench. In some embodiments, the first wrench includes one or more teeth configured to engage a plurality of annularly arranged protrusions disposed at or proximate a distal end of a suppressor assembly, the plurality of annularly arranged protrusions defining recesses therebetween. In some embodiments, the second wrench includes one or more wrench engagement surfaces configured to engage one or more corresponding suppressor engagement surfaces disposed at or proximate a proximal end of the suppressor assembly.

17 Claims, 17 Drawing Sheets

(56) References Cited

U.S. PATENT DOCUMENTS

| | | | |
|---|---|---|---|
| 9,273,920 B2 | 3/2016 | Clarke et al. | |
| 9,347,727 B1 | 5/2016 | Cler | |
| 9,933,224 B2 | 4/2018 | Dorne et al. | |
| 10,746,491 B2 | 8/2020 | Garst et al. | |
| 10,753,699 B2 | 8/2020 | Klett et al. | |
| 10,890,403 B2 | 1/2021 | Petersen | |
| 11,125,524 B2 | 9/2021 | Miele et al. | |
| 2008/0148928 A1 | 6/2008 | McClellan | |
| 2010/0199834 A1 | 8/2010 | Dueck et al. | |
| 2012/0272818 A1 | 11/2012 | Dueck et al. | |
| 2014/0216237 A1 | 8/2014 | Butler | |
| 2015/0090105 A1 | 4/2015 | Pace | |
| 2015/0290780 A1 | 10/2015 | Bennett et al. | |
| 2016/0209151 A1 | 7/2016 | Smith | |
| 2017/0299312 A1 | 10/2017 | Llewellyn, Jr. | |
| 2018/0293160 A1 | 10/2018 | van Schaik | |
| 2018/0313626 A1 | 11/2018 | Tomczak | |
| 2019/0285375 A1 | 9/2019 | Hartwell | |
| 2021/0071979 A1 | 3/2021 | Plunkett, Jr. et al. | |
| 2022/0297267 A1 | 9/2022 | Davis et al. | |
| 2025/0277642 A1* | 9/2025 | Berkeypile | F41A 21/30 |

* cited by examiner

SUPPRESSOR ASSEMBLY, TOOLSET, AND METHODS FOR ASSEMBLING AND DISASSEMBLING

TECHNICAL FIELD

The present disclosure relates generally to firearm suppressors, firearms, and tools and methods associated therewith.

BACKGROUND

Firearms, such as the AR-15 platform rifle, may generate a significant amount of noise when discharged. For a variety of reasons, users of such firearms may seek to avoid this noise, such as to prevent hearing damage. Attaching or otherwise integrating a suppressor is one way of reducing this undesirable noise, and/or prevent certain other discharge-related effects. Once attached, the suppressor may need to be disassembled and removed, such as for maintenance or storage. The various processes of assembling, disassembling, attaching, and removing a firearm suppressor from a firearm may require significant time, which may be compounded by unintuitive means and methods for such assembly/disassembly and attachment/removal.

Through applied effort, ingenuity, and innovation, the Applicant has solved problems relating to assembling and/or disassembling and attaching and/or removing suppressor assemblies by developing solutions embodied in the present disclosure, which are described in detail below.

SUMMARY

In general, embodiments of the present disclosure provide tool sets, assemblies, methods of assembling and/or disassembling, and/or the like.

In accordance with various embodiments of the present disclosure there is provided a tool set for assembling and/or disassembling a suppressor assembly. In some embodiments, the tool set includes a first wrench and a second wrench. In some embodiments, the first wrench includes one or more teeth configured to engage a plurality of annularly arranged protrusions disposed at or proximate a distal end of a suppressor assembly, the plurality of annularly arranged protrusions defining one or more recesses therebetween. In some embodiments, the second wrench includes one or more wrench engagement surfaces configured to engage one or more corresponding suppressor engagement surfaces disposed at or proximate a proximal end of the suppressor assembly.

In some embodiments, the second wrench includes an elongated bar defining a first, substantially linear portion; a second, substantially linear portion; and a third, arced portion defined between the first portion and the second portion. In some embodiments, the third, arced portion includes the one or more wrench engagement surfaces of the second wrench and are configured to engage the one or more corresponding suppressor engagement surfaces disposed at or proximate the proximal end of the suppressor assembly.

In some embodiments, the second wrench includes an elongated bar defining a first, substantially linear portion; and a second, arced portion, wherein the second, arced portion includes the one or more wrench engagement surfaces of the second wrench and are configured to engage the one or more corresponding suppressor engagement surfaces disposed at or proximate the proximal end of the suppressor assembly.

In some embodiments, the tool set further includes a third wrench including one or more wrench engagement surfaces configured to engage one or more fasteners configured to secure a suppressor shroud to a suppressor core of the suppressor assembly.

In some embodiments, the one or more fasteners include one or more threaded nuts.

In some embodiments, the first wrench includes a ring-shaped portion, wherein the one or more teeth extend at least partially toward a radial center of the ring-shaped portion from an inner side of the ring-shaped portion.

In some embodiments, the one or more teeth of the first wrench are structured to engage the plurality of annularly arranged protrusions disposed at or proximate the distal end of a suppressor shroud of the suppressor assembly, and the one or more wrench engagement surfaces of the second wrench are structured to engage the one or more corresponding suppressor engagement surfaces disposed at or proximate a proximal end of a suppressor core of the suppressor assembly, and wherein in operation, the first wrench is configured to apply a torque to the suppressor shroud in a first rotational direction and the second wrench is configured to apply a second torque to the suppressor core in a second rotational direction opposite the first rotational direction.

In some embodiments, a system may be provided that includes the tool set and the suppressor assembly.

According to various embodiments, there is provided a suppressor assembly for a firearm. In some embodiments, the suppressor assembly defines a proximal end and a distal end and a linear projectile axis extending through the suppressor assembly between the proximal end and the distal end. In some embodiments, the suppressor assembly includes a plurality of annularly arranged protrusions disposed at or proximate the distal end of the suppressor assembly, the plurality of annularly arranged protrusions defining one or more recesses therebetween. In some embodiments, the annularly arranged protrusions are configured to engage with one or more teeth of a wrench via insertion of the teeth into the recesses.

In some embodiments, the wrench includes a first wrench, and the suppressor assembly further includes one or more suppressor engagement surfaces disposed at or proximate the proximal end of the suppressor assembly and configured to engage with one or more teeth of a second wrench.

In some embodiments, the suppressor assembly further includes a suppressor core including one or more baffles, each of the one or more baffles defining an opening aligned along the linear projectile axis; and a suppressor shroud configured to cover at least a portion of the suppressor core, wherein the suppressor shroud includes the plurality of annularly arranged protrusions.

In some embodiments, the suppressor shroud includes threading configured to engage corresponding threading of the suppressor core.

In some embodiments, the suppressor shroud includes an end cap disposed at a distal end of the shroud, and wherein the end cap including the plurality of annularly arranged protrusions.

In some embodiments, the suppressor assembly includes a plurality of suppressor engagement surfaces at or proximate the proximal end of the suppressor assembly, the plurality of suppressor engagement surfaces configured to engage a second wrench to apply torque opposite the wrench.

In some embodiments, the suppressor assembly further includes one or more fasteners configured to secure the suppressor shroud to the suppressor core, wherein the one or more fasteners are aligned along the linear projectile axis.

In some embodiments, the one or more fasteners include one or more threaded nuts, and wherein the threading of the suppressor shroud is configured to be disposed proximally of the one or more threaded nuts.

In some embodiments, the one or more fasteners are disposed at or proximate the distal end of the suppressor assembly, and wherein one or more fasteners are configured to be disposed radially inward of the plurality of annularly arranged protrusions relative to the linear projectile axis.

In some embodiments, an improved firearm may be provided (e.g., an AR-15 or other rifle capable of engaging a suppressor). The improved firearm may include the suppressor assembly. The tool set may be configured to engage and interact with the suppressor assembly of the improved firearm according to the various embodiments discussed herein.

According to various embodiments, there is provided a system including the suppressor assembly and the wrench including the one or more teeth configured to engage with the one or more suppressor engagement surfaces.

According to various embodiments, there is provided a method of disassembling a suppressor assembly for a firearm. In some embodiments, the method includes engaging, by a wrench including one or more teeth, a plurality of annularly arranged protrusions disposed at or proximate the distal end of the suppressor assembly, the plurality of annularly arranged protrusions defining one or more recesses therebetween; and unscrewing, by the wrench, at least a portion of a suppressor shroud from a suppressor core of the suppressor assembly.

In some embodiments, the wrench includes a first wrench. In some embodiments, the method further includes engaging, by a second wrench including one or more wrench engagement surfaces, one or more corresponding suppressor engagement surfaces disposed at or proximate a proximal end of the suppressor assembly, wherein unscrewing at least the portion of the suppressor shroud from the suppressor core includes applying opposing torques on the suppressor shroud with the wrench and the suppressor core with the second wrench.

In some embodiments, the method further includes engaging, by a third wrench including one or more wrench engagement surfaces, one or more fasteners configured to secure the suppressor shroud to the suppressor core of the suppressor assembly; and unscrewing, by the third wrench, the one or more fasteners.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Figure 1A:
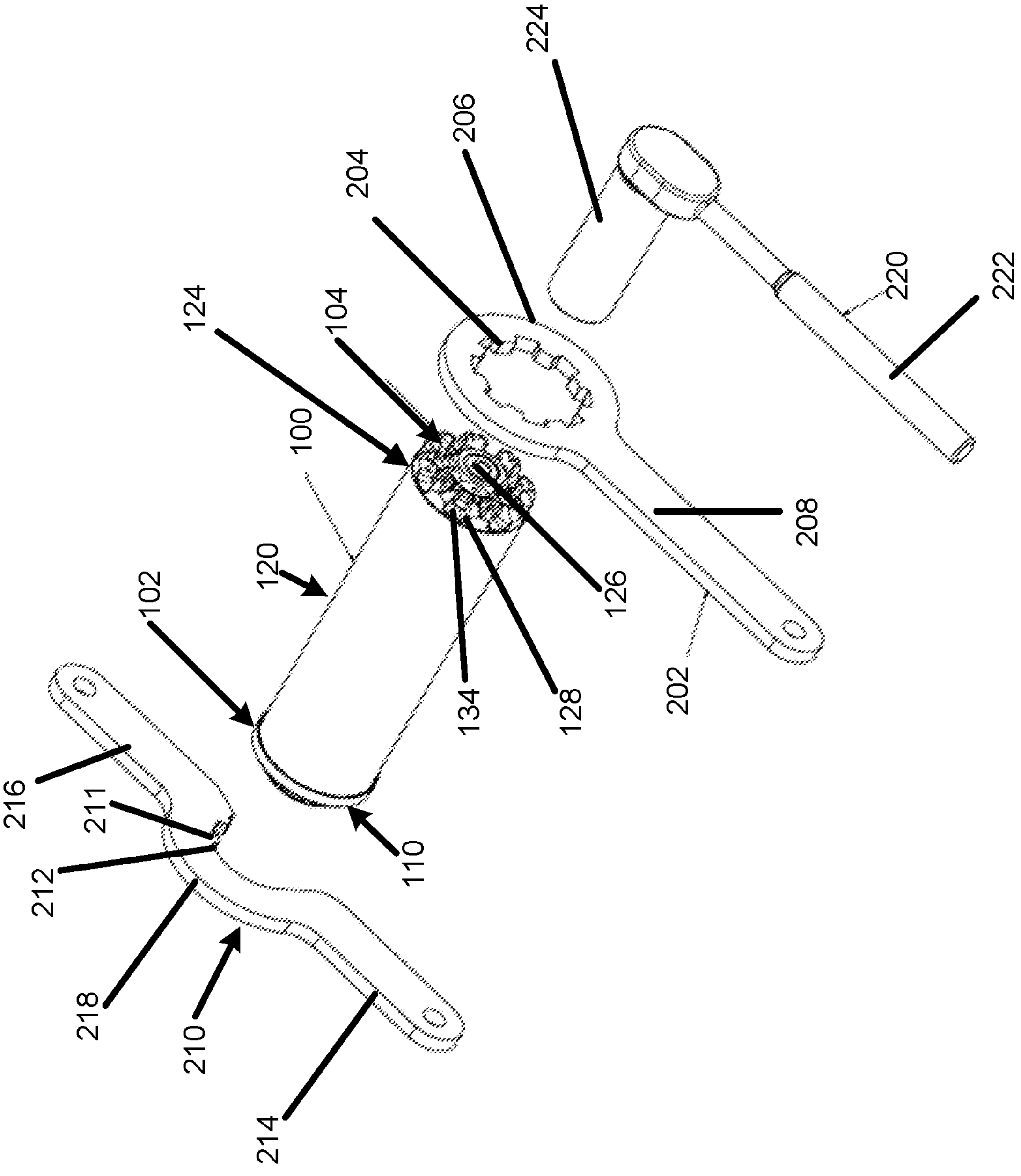
FIGS. 1A-1B are top perspective exploded views of example suppressor assemblies and example tool sets in accordance with various embodiments of the present disclosure.

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases may, but do not necessarily, refer to the same embodiment, such that the described features may be combined, in whole or in part, as part of a single embodiment, or may be described and/or claimed separately).

Overview

According to various embodiments, a tool set, a suppressor assembly, various systems, firearms, and methods of disassembling the suppressor assembly and/or decoupling the suppressor assembly from a remainder of a firearm using the tool set are provided. The suppressor assembly may be part of a firearm, such as the AR-15 platform rifle, having the suppressor assembly attached to a muzzle end of a barrel thereof. In some embodiments, the suppressor assembly may have a plurality of annularly arranged protrusions disposed at or proximate a distal end of the suppressor assembly. In some embodiments, the tool set may include a wrench having teeth configured and/or structured to engage with the annularly arranged protrusions. In some embodiments, the wrench may be configured to unscrew at least a portion of a suppressor shroud from a suppressor core of the suppressor assembly when the wrench's teeth are engaged with the plurality of annularly arranged protrusions disposed at or proximate the distal end of the suppressor assembly. In some embodiments discussed herein, two or more of the wrenches may be used to apply counteracting torques to the suppressor assembly to reduce or eliminate the incidental torque applied to other portions of the suppressor assembly and/or other components of the firearm.

In some embodiments, the tool set may include a second wrench and/or a third wrench, each of which may include one or more wrench engagement surfaces (e.g., surfaces configured to contact a surface of the suppressor assembly) and be configured to further disassemble the suppressor assembly. In some embodiments, the suppressor assembly may include one or more suppressor engagement surfaces configured to be engaged by the one or more wrench engagement surfaces of the second wrench. The second wrench may be configured to engage the engagement surfaces of the suppressor assembly while the suppressor is installed on the firearm, such as by including an open wrench face that may extend only partly around the suppressor assembly. In some embodiments, the suppressor assembly may include one or more fasteners (e.g., a nut) configured to secure the suppressor shroud to the suppressor core in addition to or instead of threading engaging the suppressor shroud and suppressor core. In some embodiments, the one or more fasteners may be configured to be engaged by the one or more engagement surfaces of the third wrench, which may then unscrew the one or more fasteners to unsecure the suppressor shroud from the suppressor core, or vice-versa. In some embodiments, the third wrench may engage the fastener through an opening in the first wrench. In some embodiments, the tool set may include additional wrenches and additional tools to further disassemble the suppressor assembly. In some embodiments, the tool set may be configured for additional tasks beyond disassembling the suppressor assembly, as desired.

Example Suppressor Assemblies

Figure 1B:
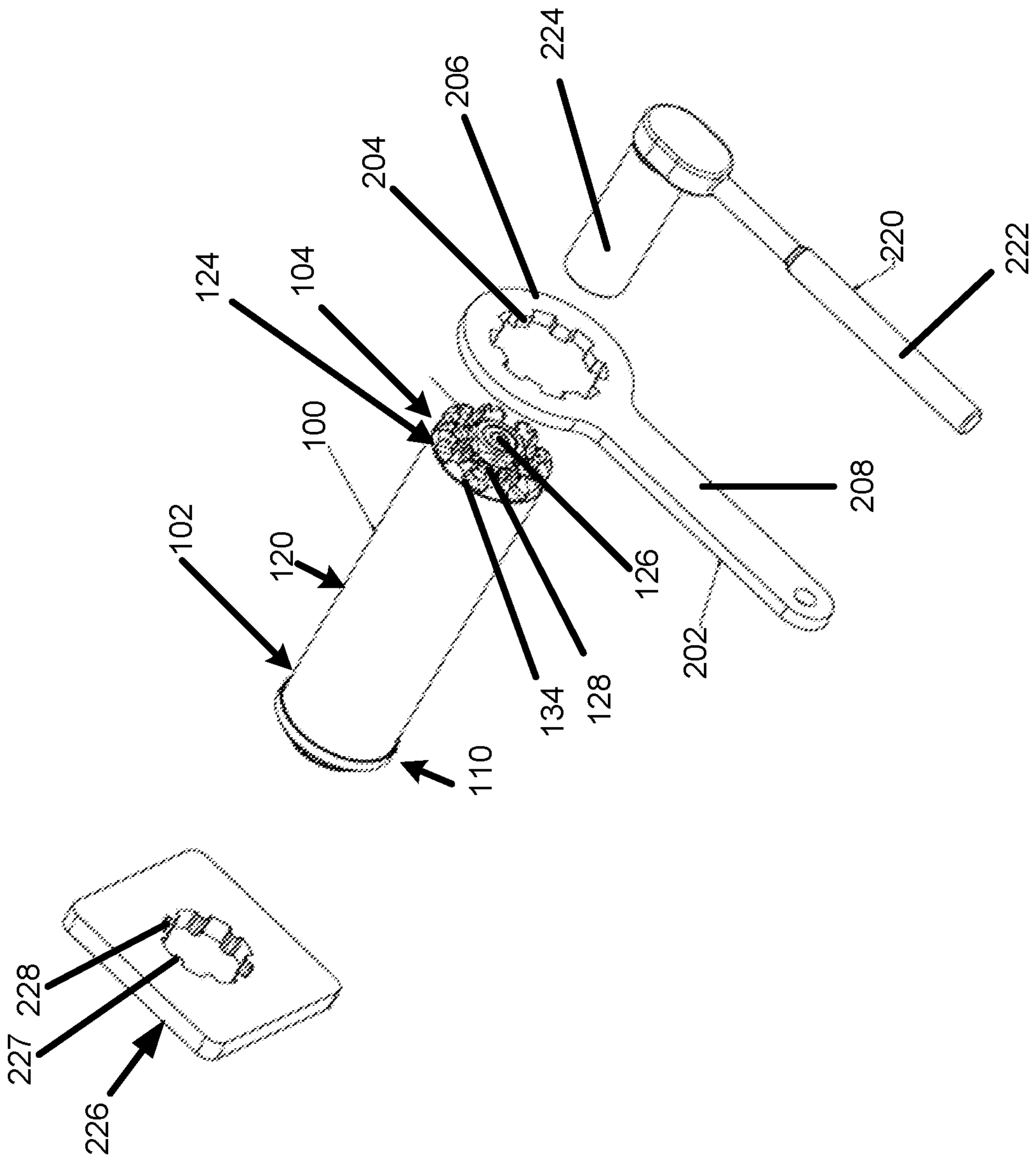
Figure 2:
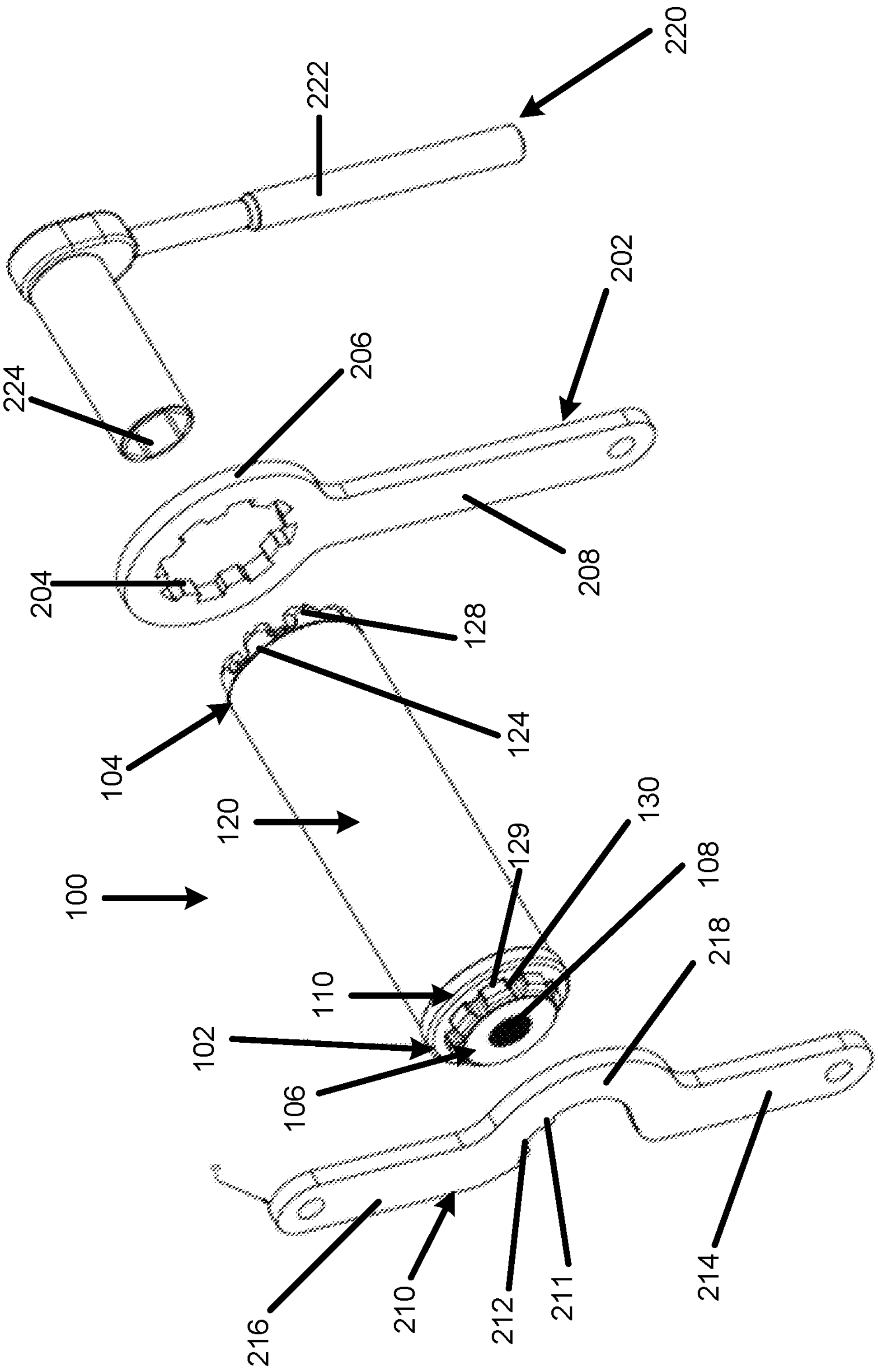
FIG. 2 is a top perspective exploded view of an example suppressor assembly and example tool set in accordance with various embodiments of the present disclosure.

Referring now to FIGS. 1, 2, and 3, top perspective views of example suppressor assemblies 100 are shown according to various embodiments. FIG. 4 shows a side, cross-sectional view of an example suppressor assembly 100, according to various embodiments.

In some embodiments, the suppressor assembly 100 may define a proximal end 102 and a distal end 104. In some embodiments, the proximal end 102 may be configured to face toward and/or attach to a barrel of an example firearm, such as the AR-15 platform rifle or any other firearm (e.g., AR-10 platform rifles) capable of using a suppressor. In some embodiments, the suppressor assembly 100 may include a muzzle opening at the proximal end 102 and an exit opening at the distal end 104. In some embodiments, the distal end 104 may be the end out of which a projectile is propelled upon discharge of the firearm to which the suppressor assembly 100 is attached. In some embodiments, for example as illustrated in FIG. 4, a linear projectile axis 105 may extend through the suppressor assembly 100 between the proximal end 102 and the distal end 104.

In some embodiments, the suppressor assembly 100 may be configured to attach to a firearm, such as the AR-15 platform rifle. In some embodiments, to facilitate that connection, the suppressor assembly 100 may include an attachment portion 106, which may be configured to attach to the muzzle of a firearm barrel. In some embodiments, the attachment portion 106 may include proximal threading 108. In some embodiments, the suppressor assembly 100 may be attached to a firearm barrel by the proximal threading 108, which may thread onto a corresponding threading on the muzzle of the firearm barrel. In some embodiments, when the firearm is discharged, it may release propellant gases as a result. In some embodiments, portion of the gas may be captured by one or more gas ports in the barrel and redirected to the action for cycling the firearm (e.g., in an autoloading firearm, such as the AR-15 platform weapons) or may be released via other openings on the firearm. In some embodiments, when the suppressor assembly 100 is attached, a remaining portion of the propellent gas moves from the barrel into the suppressor assembly 100.

In some embodiments, the suppressor assembly 100 may include a suppressor core 110. In some embodiments, the suppressor core 110 may include one or more baffles 112. In some embodiments, each of the baffles 112 may define an opening 114. In some embodiments, these openings 114 may be aligned along the linear projectile axis 105, such that the linear projectile axis 105 projects through the openings 114, as well as through the muzzle opening at the proximal end 102 and the exit opening at the distal end 104. In some embodiments, the suppressor core 110 may define a an expansion chamber 111, along with one or more secondary chambers 119 and/or other interior portions of the suppressor core 110. In some embodiments, the baffles 112 may separate the expansion chamber 111 and the secondary chambers 119. In some embodiments, the expansion chamber 111 may be fluidly connected to the secondary chambers 119 as well as to the muzzle opening and exit opening at the proximal end 102 and distal end 104, respectively. In some embodiments, the expansion chamber 111 and the secondary chambers 119 may be configured to receive propellant gases from the firearm. In some embodiments, such as the depicted embodiment of FIG. 4, the attachment portion 106 is formed as part of the suppressor core 110.

In some embodiments, the suppressor assembly 100 may include a suppressor shroud 120 disposed at least partially about the suppressor core 110. In some embodiments, the suppressor shroud 120 may include an external cylinder 122 and an end cap 124. In some embodiments, the end cap 124 may be disposed at the proximal end 102 of the suppressor assembly 100. In some embodiments, the end cap 124 may be a cap weldment permanently affixed to the external cylinder 122 (e.g., by welding, press fit, or the like). In some embodiments, the end cap 124 may be integral with the external cylinder 122 as a single piece. In some embodiments, the external cylinder 122 may contain and/or encapsulate at least a portion of the suppressor core 110.

In some embodiments, the suppressor assembly 100 may include one or more fasteners 126. In some embodiments, the one or more fasteners 126 may be configured to secure the suppressor shroud 120 to the suppressor core 110. In some embodiments, the one or more fasteners may be a suppressor nut 126. In some embodiments, the suppressor nut 126 may be disposed at the distal end 104 of the suppressor assembly 100. In some embodiments, the suppressor nut 126 may operably engage with a distal threading 132 of the suppressor assembly 100. This can be seen in at least FIGS. 4, 9, 10, and 11. In some embodiments, the suppressor nut 126 may be a lock nut.

In some embodiments, the end cap 124 may include threading configured to engage the distal threading 132 of the suppressor core 110 in addition to or instead of the suppressor nut 126. For example, with reference to FIGS. 4, 9, 10, and 11, the end cap 124 of the shroud 120 may be threaded onto the distal threading 132 of the suppressor core 110 before the suppressor nut 126 is threaded onto the distal threading 132 such that the suppressor nut further secures the shroud onto the suppressor core.

In some embodiments, the suppressor assembly 100 may include a plurality of protrusions 128 disposed at or proximate the distal end 104 of the suppressor assembly 100. In some embodiments, the plurality of protrusions 128 may define a plurality of recesses 134 between them. During assembly, at least a portion the surfaces of the protrusions 128 defining the recesses 134 may define engagement surfaces that contact a tool to facilitate application of a torque to the suppressor shroud 120 via the end cap 124. The recesses 134 may be open to a radially-outward side of the suppressor, a radially-inward side of each castellation, and/or an axially-distal side of the suppressor to receive one or more portions of one or more tools.

Figure 3A:
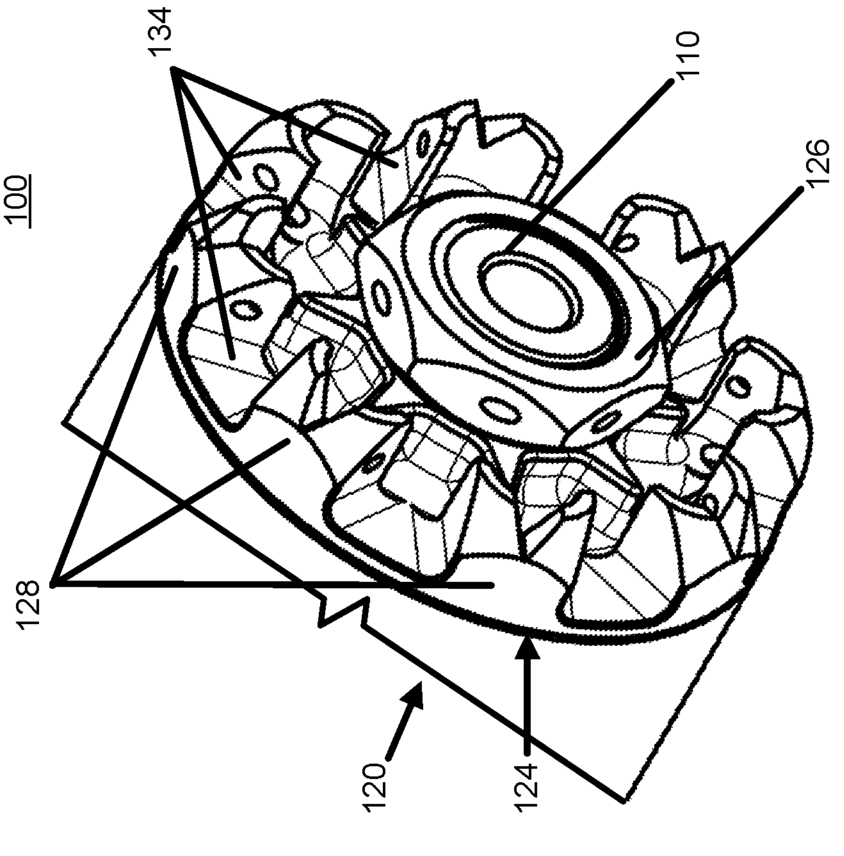
FIG. 3A is a partial perspective view of a distal end of a suppressor assembly in accordance with various embodiments of the present disclosure.
Figure 4:
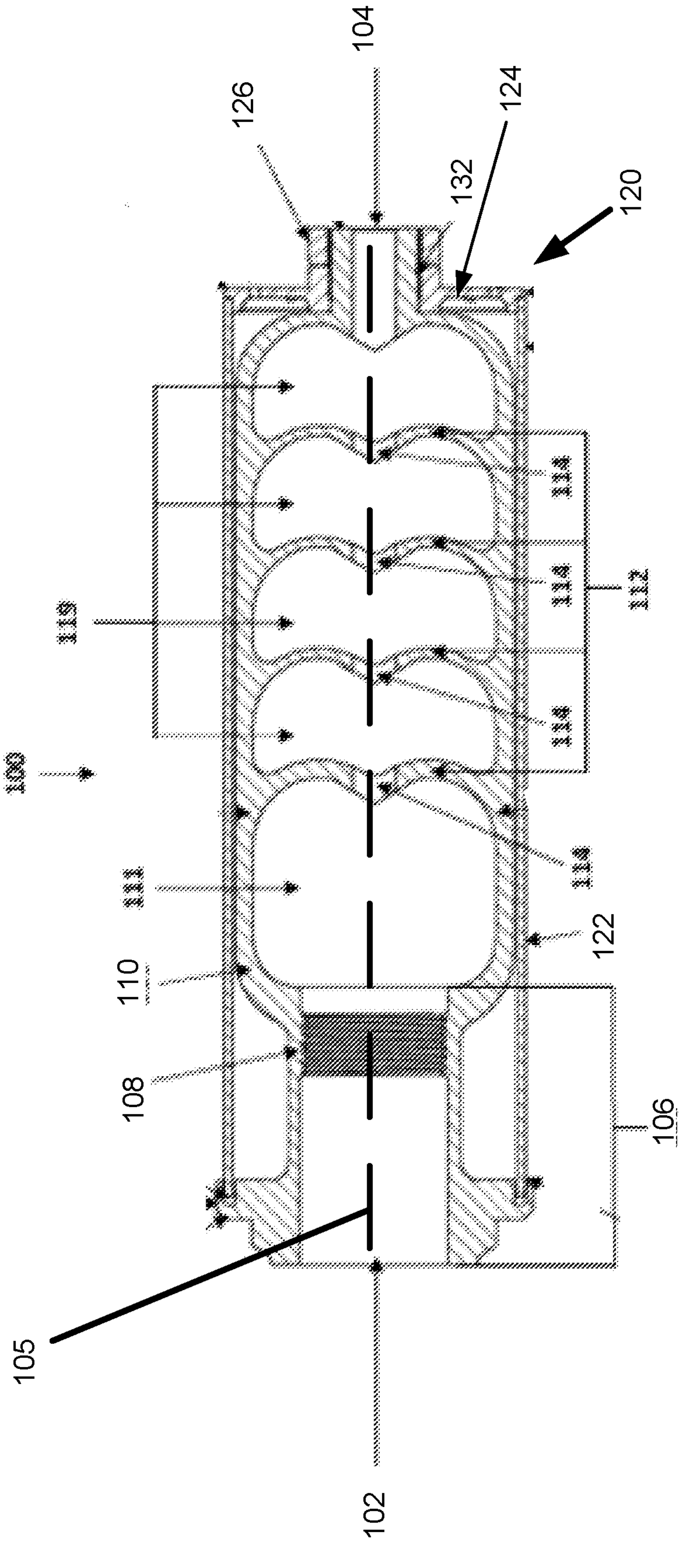
FIG. 4 is an elevation, side, cross-sectional view of an example suppressor assembly in accordance with various embodiments of the present disclosure.
Figure 5:
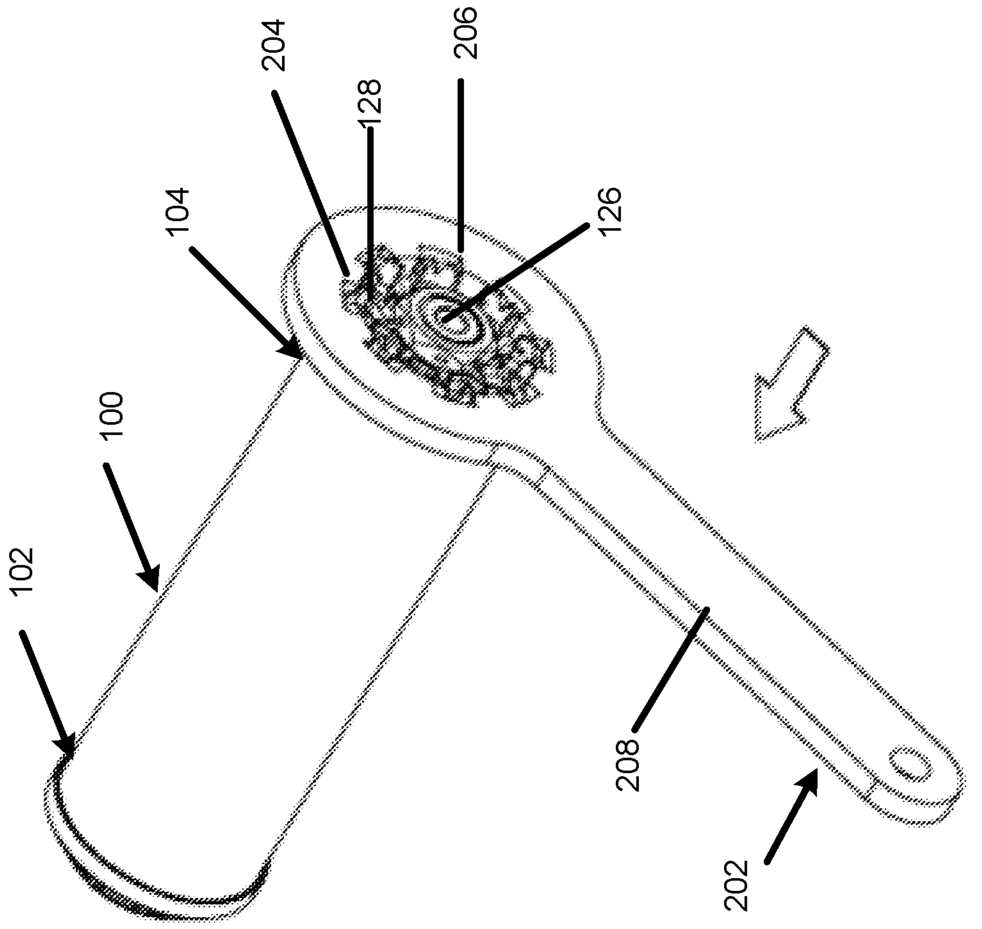
FIG. 5 is a top perspective view of an example suppressor assembly and at least a portion of an example tool set in accordance with various embodiments of the present disclosure.
Figure 6:
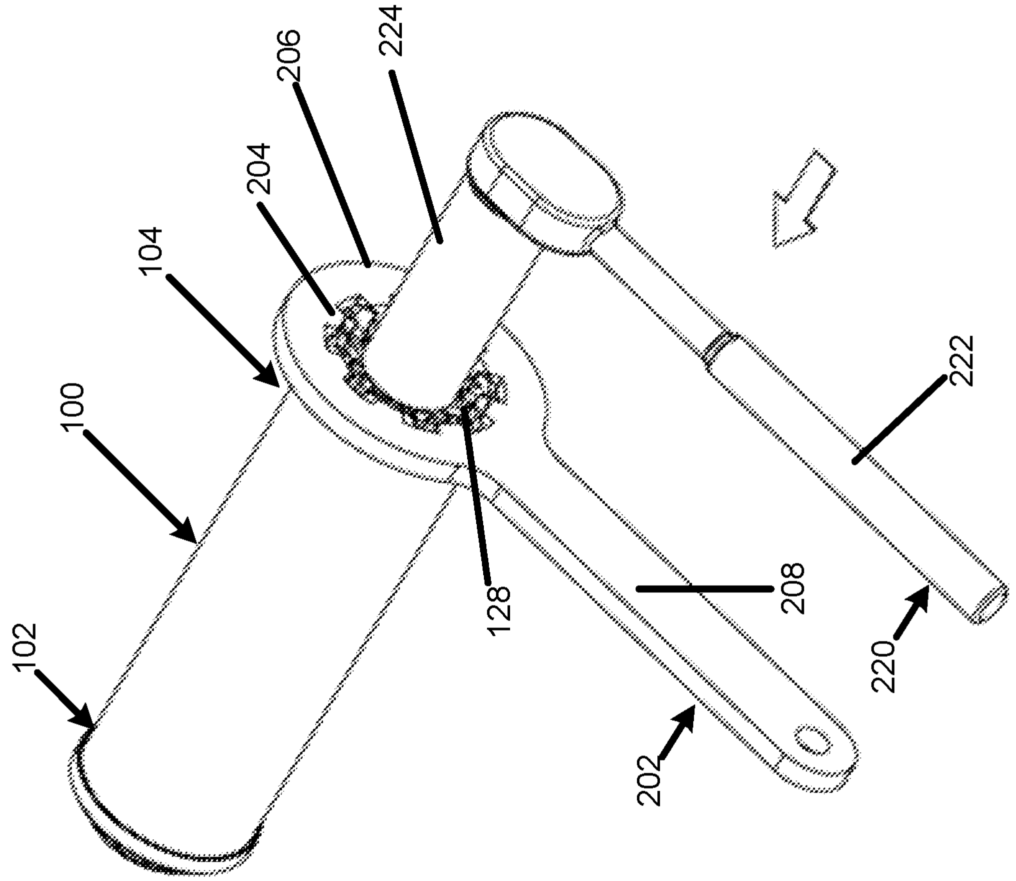
FIG. 6 is a top perspective view of an example suppressor assembly and at least a portion of an example tool set in accordance with various embodiments of the present disclosure.
Figure 7:
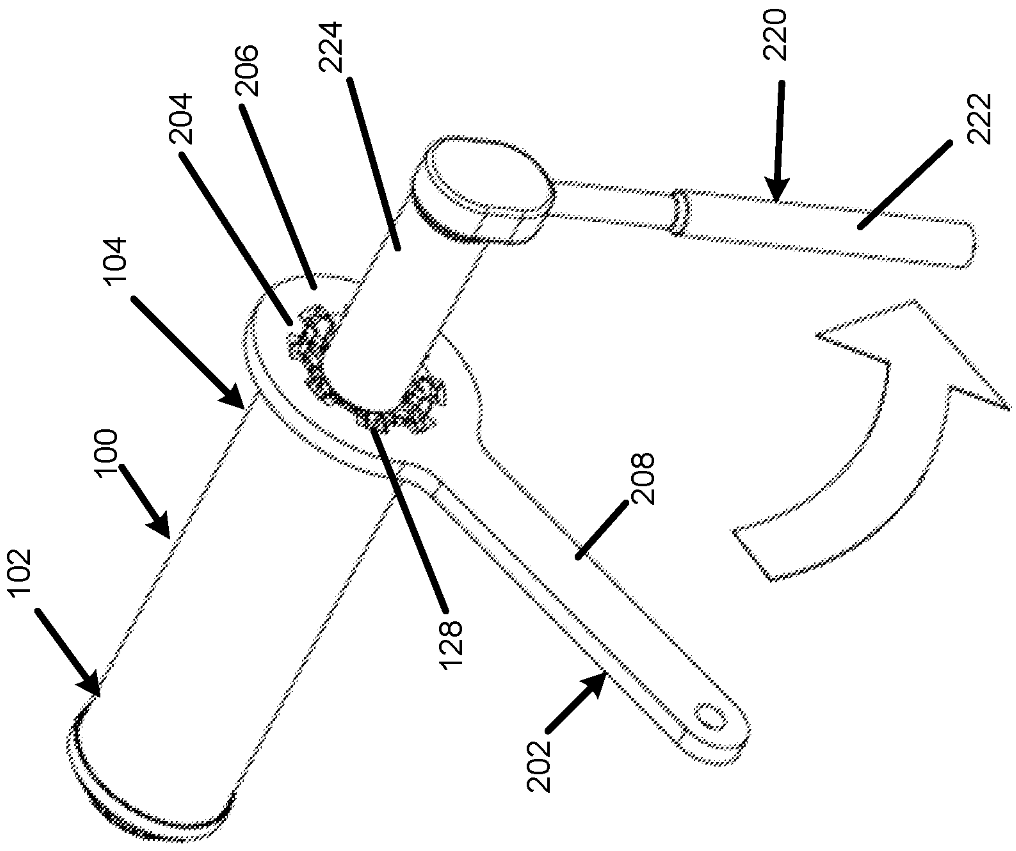
FIG. 7 is a top perspective exploded view of an example suppressor assembly and at least a portion of an example tool set in accordance with various embodiments of the present disclosure.
Figure 8:
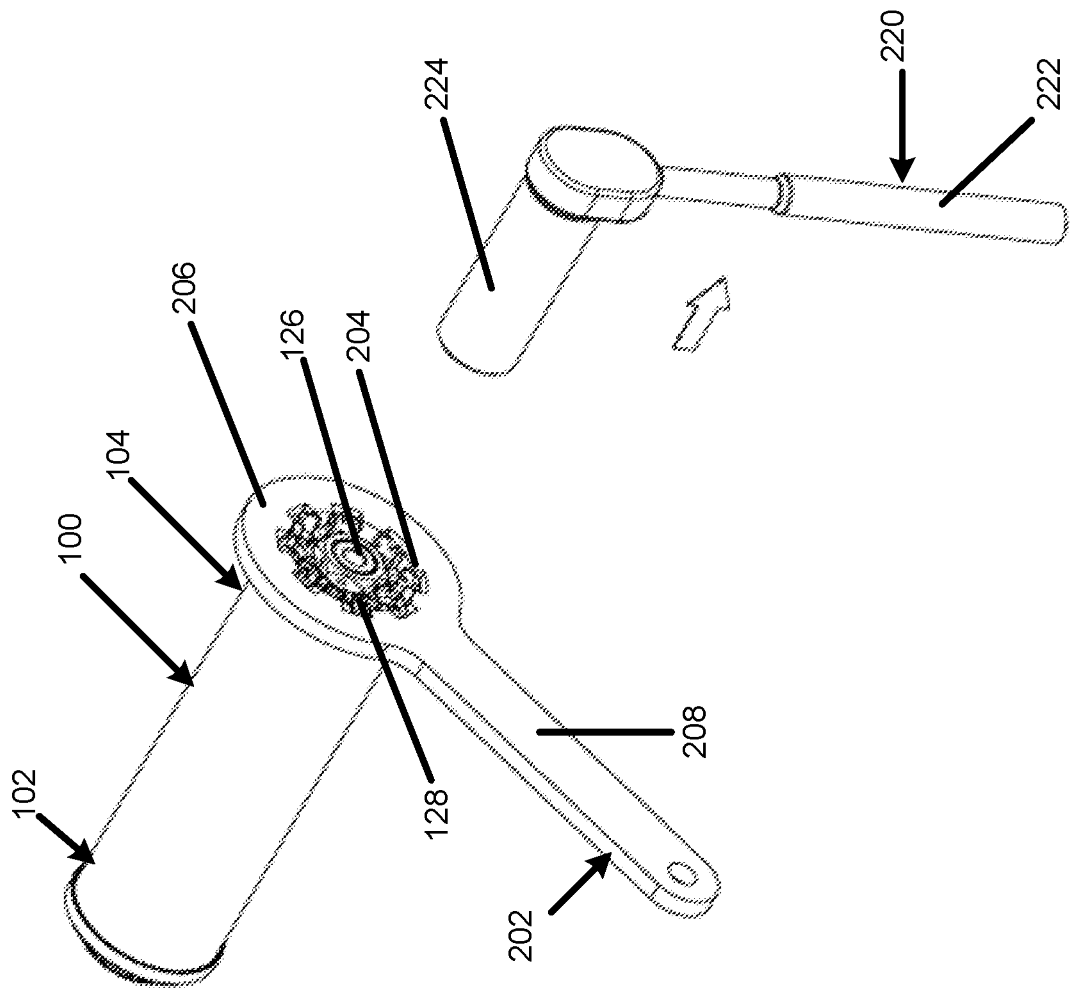
FIG. 8 is a top perspective view of an example suppressor assembly and at least a portion of an example tool set in accordance with various embodiments of the present disclosure.
Figure 9:
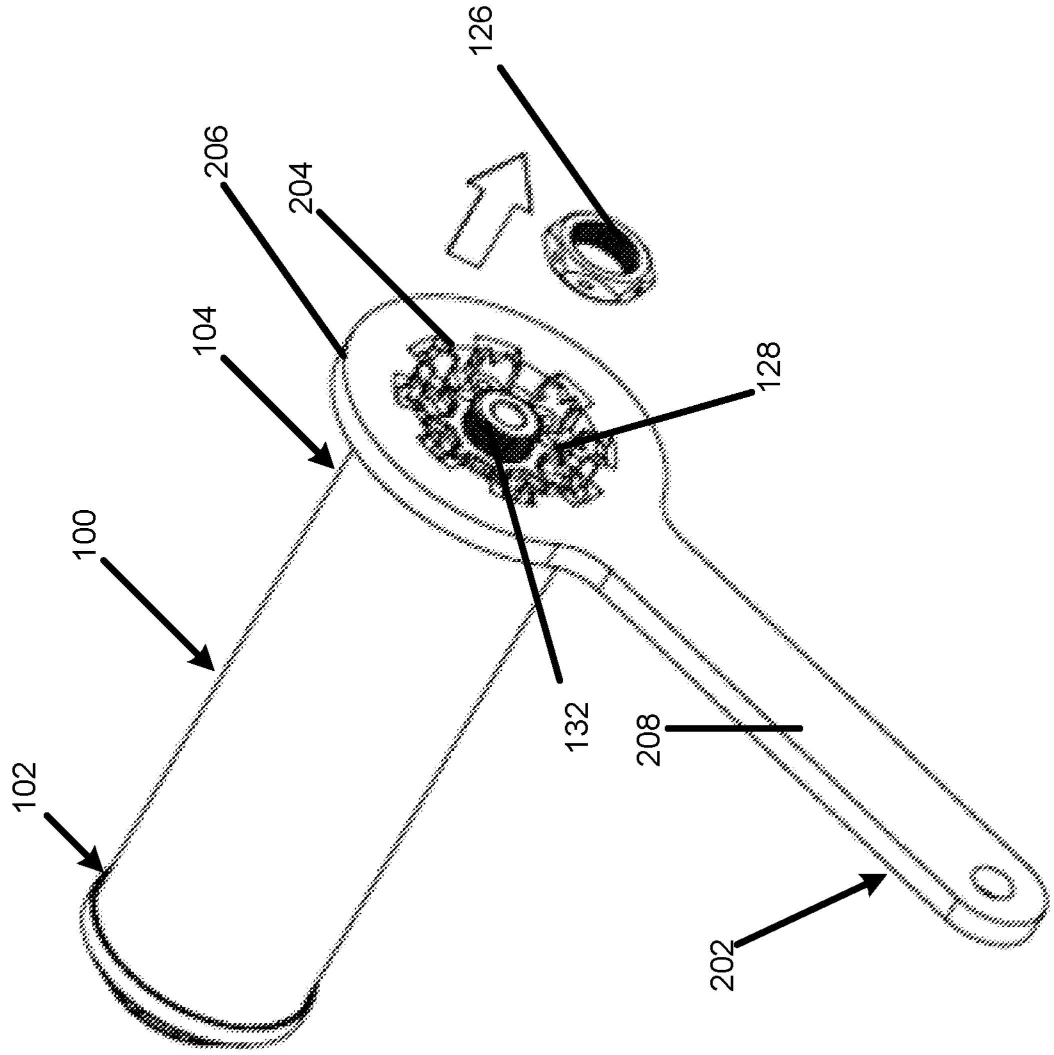
FIG. 9 is a top perspective view of an example suppressor assembly and at least a portion of an example tool set in accordance with various embodiments of the present disclosure.
Figure 10:
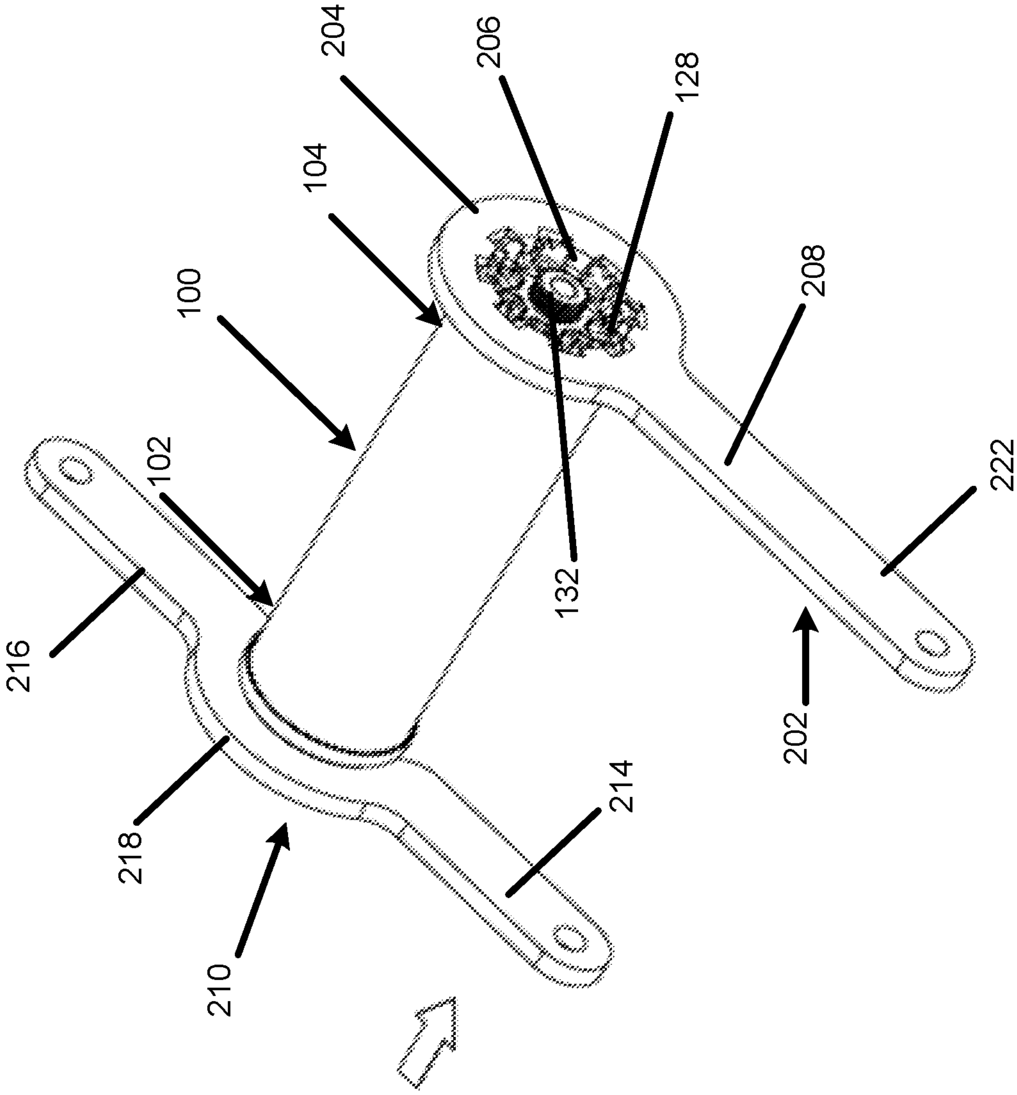
FIG. 10 is a top perspective view of an example suppressor assembly and at least a portion of an example tool set in accordance with various embodiments of the present disclosure.
Figure 11:
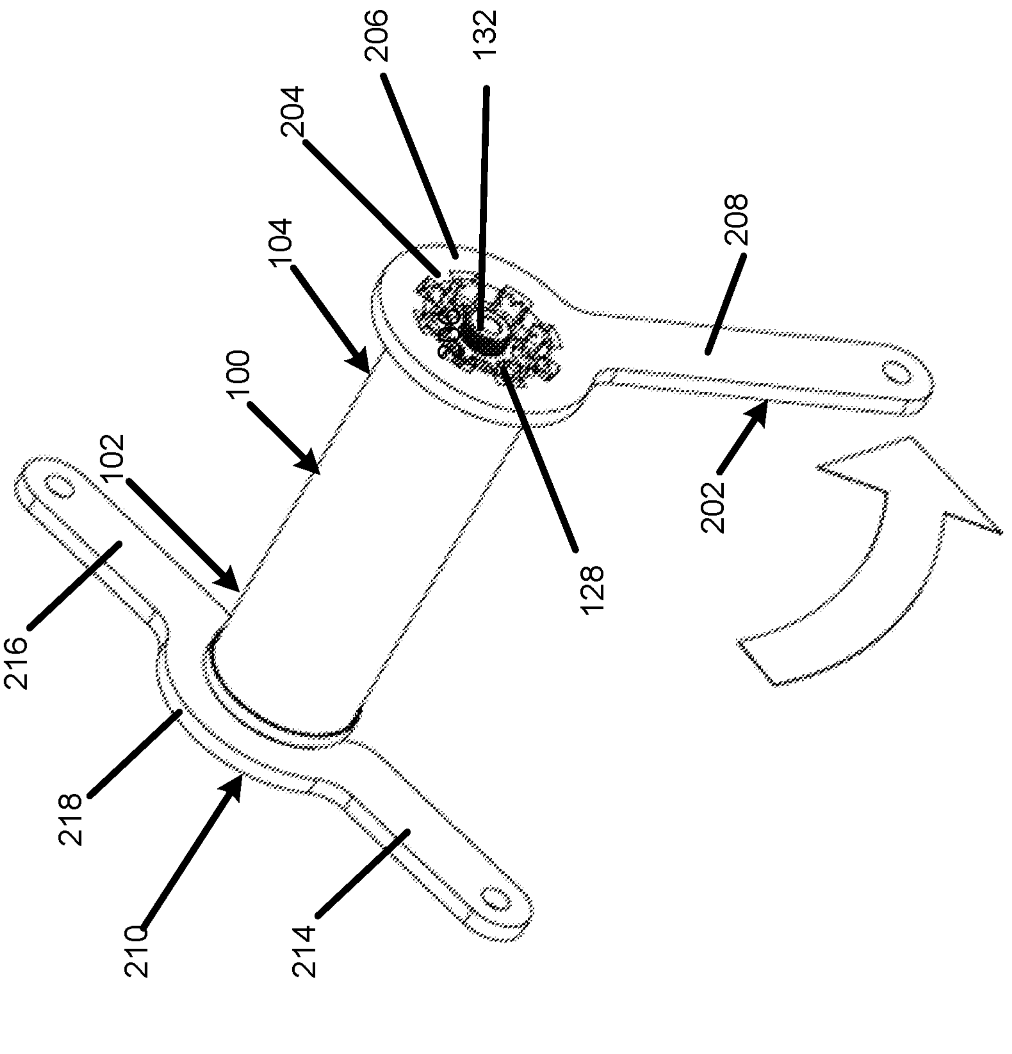
FIG. 11 is a top perspective exploded view of an example suppressor assembly and at least a portion of an example tool set in accordance with various embodiments of the present disclosure.
Figure 12:
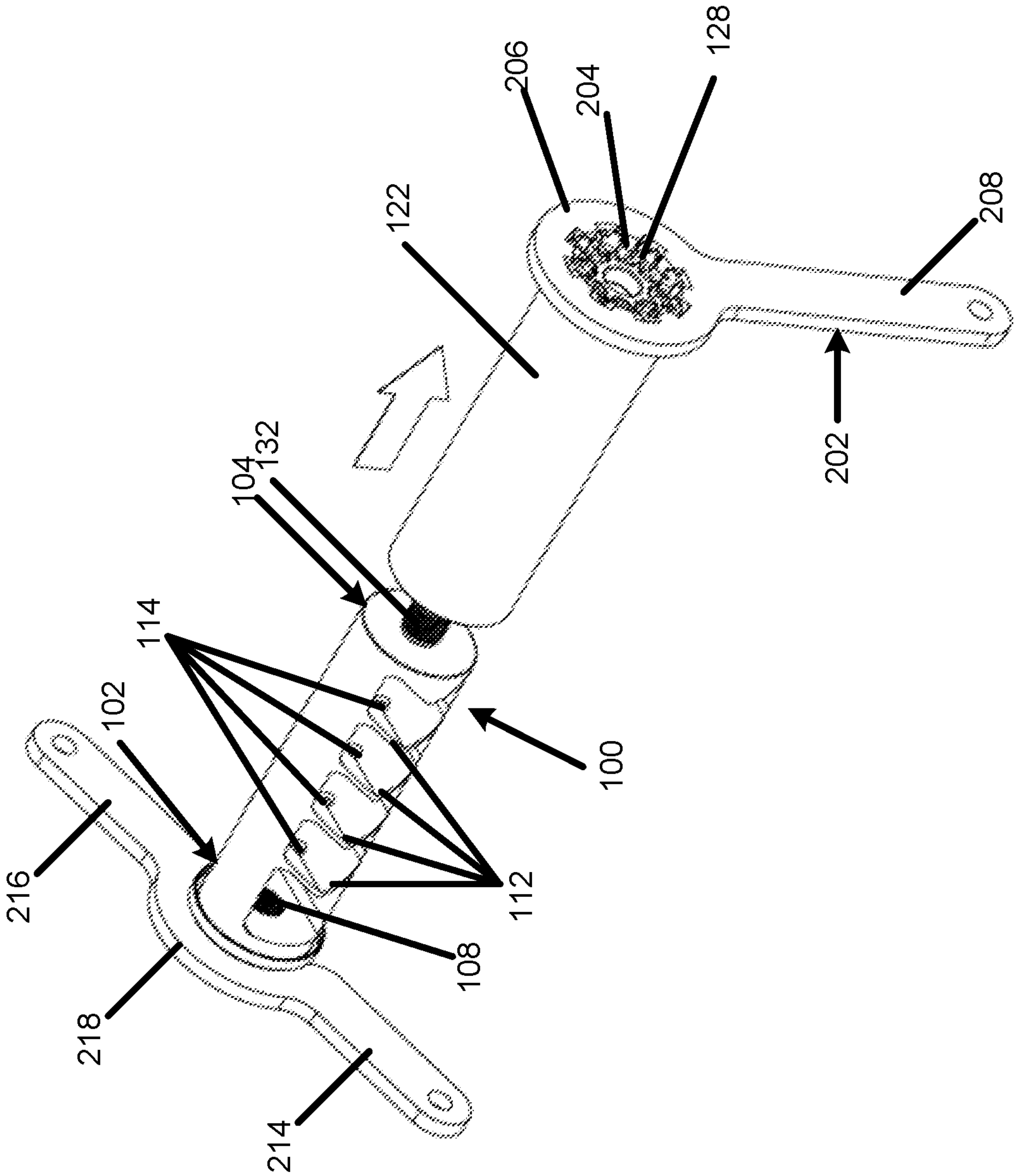
FIG. 12 is a top perspective exploded view of an example suppressor assembly and at least a portion of an example tool set in accordance with various embodiments of the present disclosure.

With reference to FIG. 3A, the plurality of protrusions 128 may extend in a distal direction (e.g., away from the firearm towards the target) from the underlying surface of the end cap 124. For example, an outer diameter of the shroud 120 at the axial positions of the protrusions 128 may be less than or equal to an outer diameter of the shroud 120 at the axial positions of the external cylinder 122. The plurality of protrusions 128 may encircle the distal threading 132 and/or the suppressor nut 126 when the suppressor is assembled.

In some embodiments, the plurality of protrusions 128 may be integral with or affixed to the end cap 124. In some embodiments, the plurality of protrusions 128 may define one or more castellations, including various points and indentations, various radial and axial recesses, and the like, such as those shown in FIG. 3A. In some embodiments, the plurality of protrusions 128 may be disposed on one of more components of the suppressor assembly 100, including the suppressor core 110 and/or the suppressor shroud 120. In some embodiments, the plurality of protrusions 128 may be configured to break up or disperse a muzzle blast from an example firearm as the gas progresses through the suppressor assembly 100. For example, the protrusions 128 may include curved and/or angled surfaces to engage gas that is expelled from ports (see e.g., FIGS. 3C-3D) at a distal end of the suppressor. It will be understood that the size, geometry, orientation, and number of the plurality of protrusions 128 may vary according to various embodiments and may be configured as desired by a user or manufacturer of the suppressor assembly 100. For example, the plurality of protrusions may include two or more protrusions, and the protrusions may have any shape configured to engage corresponding shapes on a wrench (e.g., including, but not limited to, the shapes disclosed in various embodiments herein and including the shapes of the proximal protrusions 129 shown in FIG. 3B).

Figure 3B:
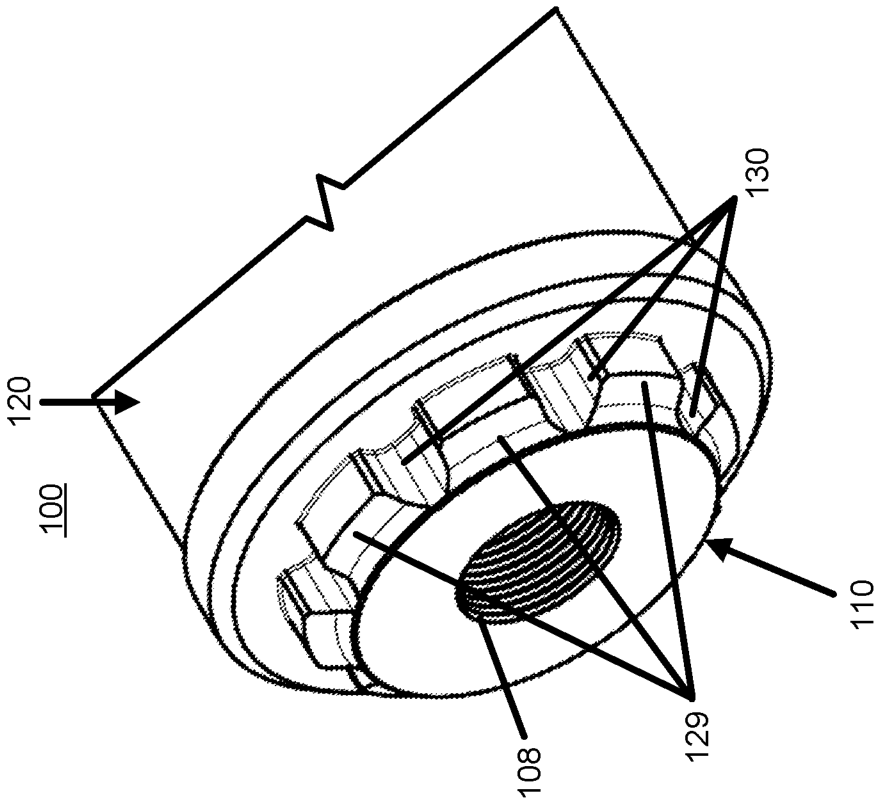
FIG. 3B is a partial perspective view of a proximal end of a suppressor assembly in accordance with various embodiments of the present disclosure.

In some embodiments, with reference to FIG. 3B, the suppressor assembly 100 may include one or more proximal protrusions 129 which may define one or more suppressor engagement surfaces 130 disposed at or proximate the proximal end 102 of the suppressor assembly 100. In some embodiments, the suppressor engagement surfaces 130 may be disposed on the suppressor shroud 120 and/or the suppressor core 110. For example in the depicted embodiment of FIG. 3B, the suppressor engagement surfaces 130 of the proximal end are formed on the suppressor core 110, while the distal protrusions 128 and respective engagement surfaces are formed on the shroud 120 to facilitate applying a torque to the suppressor assembly 100 (e.g., to disconnect the shroud 120 from the core 110). In the depicted embodiment, the suppressor engagement surfaces 130 comprise circumferential recesses configured to engage teeth of a tool. In some embodiments, the suppressor engagement surfaces 130 may be disposed annularly around the attachment portion 106. In some embodiments, the suppressor engagement surfaces 130 may protrude from the proximal end 102 such that the suppressor engagement surface 130 may be engaged by one or more tools while the suppressor assembly 100 is attached to a firearm barrel via the attachment portion 106.

Figure 3D:
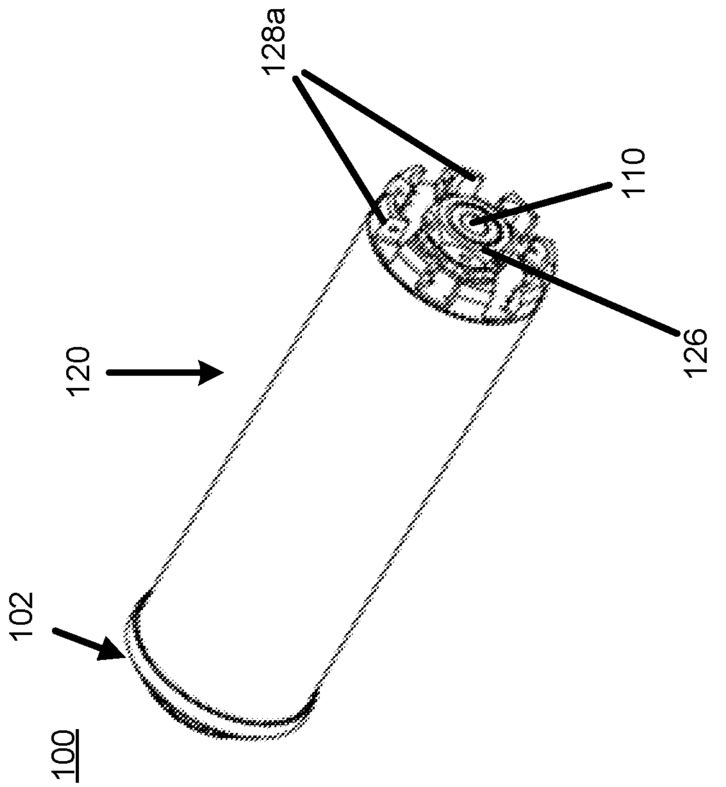
FIG. 3D is a perspective view of a distal end of a suppressor assembly in accordance with various embodiments of the present disclosure.
Figure 3C:
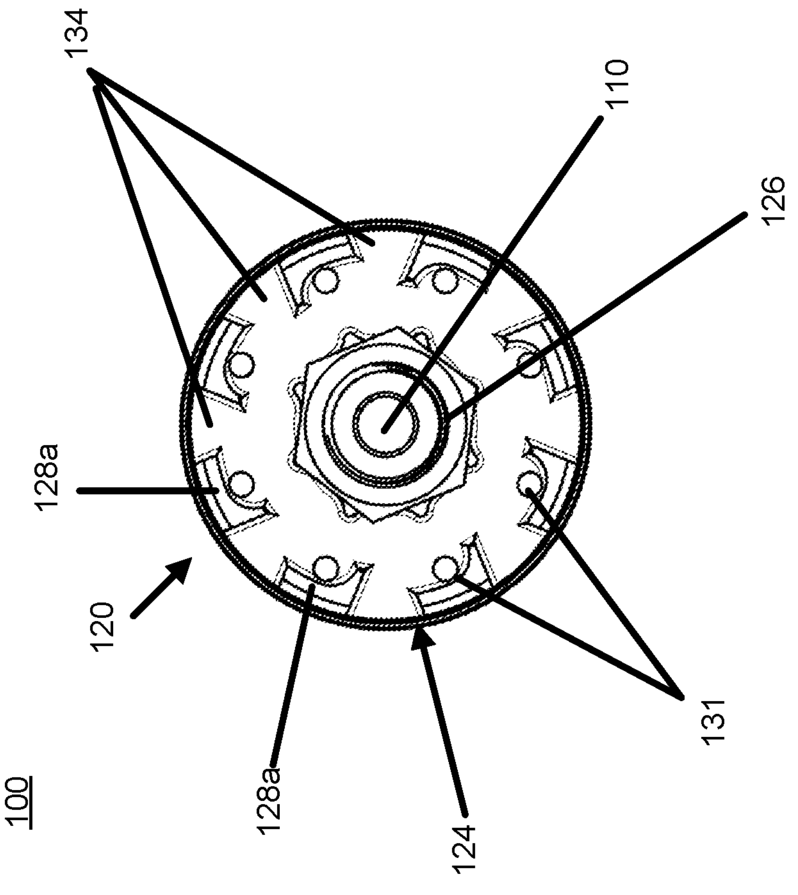
FIG. 3C is a top plan view of a distal end of a suppressor assembly in accordance with various embodiments of the present disclosure.

With reference to FIGS. 3C-3D, in various embodiments, the plurality of protrusions 128*a* may include one or more additional or alternative structures other than the previously described castellations. For example, as shown in FIGS. 3C-3D, the plurality of protrusions 128*a* may be L-shaped castellations configured to have one or more gas ports 131 of the suppressor disposed adjacent to the L-shaped castellations. In some embodiments, the gas ports 131 may be configured to vent or otherwise discharge propellant gases from the suppressor, and the protrusions 128*a* may be configured to engage, direct, suppress, or otherwise interact with the gas leaving the suppressor. The L-shaped castellations 128*a* may further present engagement surfaces for a wrench in a similar manner to the protrusions 128 shown and described in reference to FIGS. 3A-3B. In some embodiments, the suppressor engagement surfaces may include additional or alternative structures, such as flat, engageable surfaces for facilitating the relative rotation of the various suppressor components during assembly and disassembly (e.g., for engaging with a flat-sided wrench, socket, pin holes, or the like).

Example Tool Sets

Referring again to FIGS. 1A-1B and 2, top perspective views of example tool sets 200 are shown according to various embodiments. In some embodiments, a tool set 200 may include one or more wrenches for assembling and disassembling the suppressor assembly 100 and its various components with each other and/or with a firearm as previously described. In some embodiments, the tool set 200 may include other tools in addition to wrenches.

In some embodiments, the example tool set 200 may include a first wrench 202. In some embodiments, the first wrench 202 may include one or more teeth 204. For example, in the depicted embodiments of FIGS. 1A-2, the teeth are inwardly-projecting protrusions configured to engage the recesses 134 of the distal end of the suppressor assembly. In some embodiments, the first wrench 202 may be a suppressor shroud wrench configured to engage and apply a torque to the suppressor shroud 120. In some embodiments, the first wrench 202 may include a ring-shaped portion 206 and a gripping portion 208. In some embodiments, the ring-shaped portion 206 may define the one or more teeth 204, which may extend at least partially toward a radial center of the ring-shaped portion 206. In some embodiments, the radial center of the ring-shaped portion 206 may be aligned along the linear projectile axis 105. In some embodiments, the gripping portion 208 may be an elongated, rod-shaped portion configured to be gripped by a user. While depicted as a complete ring, in some embodiments, the ring-shaped portion 206 may be a partial ring or other shape having teeth configured to engage the recesses.

In some embodiments, the one or more teeth 204 may be configured to engage the plurality of protrusions 128 of the suppressor assembly 100 by inserting into the recesses 134 and rotating the wrench about the axis of the suppressor assembly. The teeth 204 may be inserted into the recesses 134 by translating the wrench in the axial direction towards the proximal end 102 of the suppressor assembly. In some embodiments, the first wrench 202 may be configured to be used to apply a torque to the suppressor assembly 100 or its various components in a first rotational direction as indicated in at least FIG. 11.

In some embodiments, the tool set 200 may include a second wrench 210. In some embodiments, the second wrench 210 may be a suppressor core wrench configured to engage and apply a torque to the suppressor core 110. In some embodiments, the second wrench 210 may include a first portion 214 that may be substantially linear, a second portion 216 that may be substantially linear, and a third portion 218 that may be defined between the first 214 and second portions 216. In some embodiments, the third portion 218 may be substantially arced. As depicted, the third portion 218 is a semi-circular shape having teeth 211 on a radially inward side of the semi-circle. The third portion 218 may be open sided (e.g., not a complete circle) so that the wrench may engage the suppressor core 110 while the suppressor is installed on a firearm. In the depicted embodiment, the teeth 211 are formed asymmetrically only on one portion of the third portion 218 of the wrench (e.g., two teeth 211 only on the right side relative to the perspective of FIGS. 1A-1B). In some embodiments, the second wrench 210 may be used reversibly by swapping the positions of the first portion 214 of the second wrench 210 and the second portion 216 of the second wrench 210 to apply torques in different directions (e.g., for assembling and disassembling the suppressor assembly respectively). In some embodiments, the teeth 211 may be symmetrically oriented relative to a center of the second wrench 210. In some embodiments, the third portion 218 may include teeth having wrench engagement surfaces 212 of the second wrench 210 that may be configured to engage with the suppressor engagement surfaces 130 of the suppressor assembly 100 (e.g., by inserting the teeth of the wrench into recesses between the proximal protrusions 129 of the suppressor core or otherwise by rotationally interlocking the wrench and suppressor core). In some embodiments, the second wrench 210 may be configured to engage the suppressor assembly 100 by translating and/or rotating the second wrench within a plane perpendicular to the linear projectile axis 105, shown in FIG. 4, of the suppressor assembly 100 (e.g., by hooking the teeth 211 of the wrench onto the proximal protrusions translationally and then rotating the wrench until a non-toothed portion of the third portion 218 of the second wrench engages the suppressor assembly). In some embodiments, the second wrench 210 may be configured to apply a torque to the suppressor assembly 100 or its various components after engagement with the suppressor engagement surfaces 130 and rotation of the wrench and/or rotation of the first wrench 202 while holding the second wrench stationary. In some embodiments, the second wrench 210 may include only one of the first portion 214 or the second portion 216 with the third portion 218. In some embodiments, the first portion 214 and/or the second portion 216 may be arced, similarly to the third portion 218.

In some embodiments, the second wrench 210 may be configured to assist with attaching and detaching the suppressor assembly 100 from the barrel of a firearm and/or with decoupling the suppressor shroud 120 and the suppressor core 110. As described herein, the second wrench 210 may be used to rotate the entire suppressor assembly 100 relative to the barrel of the firearm and/or to apply counter-acting torque to the first wrench during disassembly of the shroud 120 and suppressor core 110.

In some embodiments, and as shown in at least FIG. 1B, the tool set 200 may include a mount 226 which may be used instead of the second wrench 210. In some embodiments, the mount 226 may be a vice mount configured to support the suppressor assembly in a vice. In the depicted embodiment of FIG. 1B, the mount 226 is substantially square or rectangular in shape. In some embodiments, the mount 226 may include a plurality of teeth 227 having mount engagement surfaces 228. In some embodiments, the mount 226 may be configured to support the suppressor assembly 100 and/or one or more components of the suppressor assembly 100 (e.g., the suppressor core 110) when the suppressor assembly 100 and/or its one or more components are being manipulated while not engaged with a firearm. In some embodiments, the mount engagement surfaces 228 may extend toward a radial center of the mount 226, which may be aligned along the linear projectile axis 105. The mount 226 may be engaged with the suppressor assembly 100 or a portion thereof by translating the mount along the linear projectile axis 105.

In some embodiments, the tool set 200 may include a third wrench 220. In some embodiments, the third wrench 220 may include a gripping portion 222 that may be configured to be held by a user when using the third wrench 220. In some embodiments, the third wrench may include one or more wrench engagement surfaces 224 configured to engage with one or more fasteners. In some embodiments, the third wrench 220 may be configured to apply a torque to the suppressor assembly 100 or its various components after engagement with the one or more fasteners. In some embodiments, the wrench engagement surfaces 224 of the third wrench 220 may be equivalent to the wrench engagement surfaces 212 of the second wrench 210. In some embodiments, the wrench engagement surfaces 224 of the third wrench 220 may be different than the wrench engagement surfaces 212 of the second wrench 210. In some embodiments, the wrench engagement surfaces 224 of the third wrench 220 may be configured to engage the suppressor nut 126 of the suppressor assembly 100. In some embodiments, the third wrench 220 may be a ratchet (e.g., a socket wrench). In some embodiments, the third wrench 220 may include a breaker bar, any other type of wrench, or any other device configured to engage and remove the nut (e.g., a machine with a welded together engagement structure).

Other shapes of the various engagement surfaces of the wrenches and/or suppressor components will be appreciated by those of skill in the art in light of the present disclosure. The various shapes may include, but are not limited to, any wrench and suppressor structure capable of temporarily rotationally locking one or more wrenches with one or more suppressor components for carrying out the various functions described herein.

Example Methods of Disassembling and Assembling a Suppressor Assembly

Figure 13:
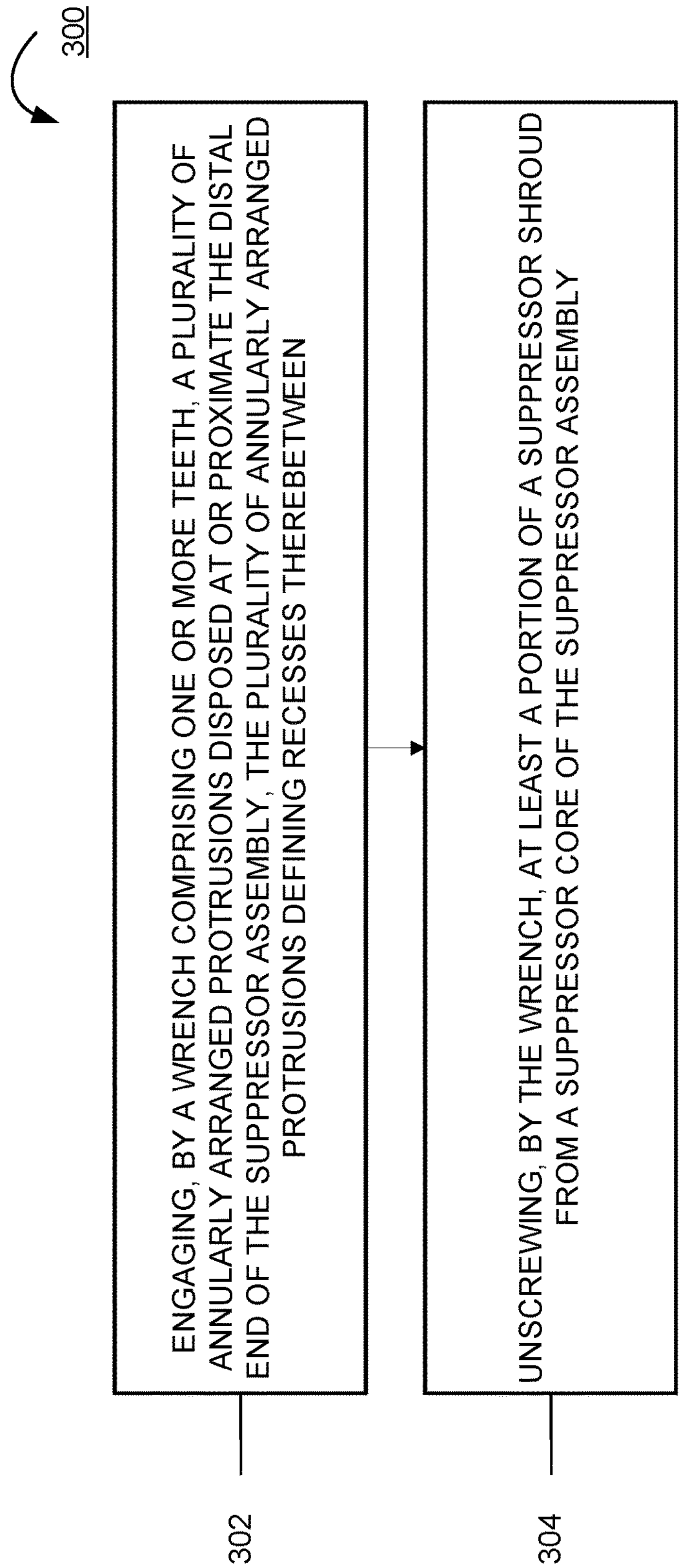
FIG. 13 is a flow chart illustrating an example method of disassembling a suppressor for a firearm in accordance with various embodiments of the present disclosure.
Figure 14:
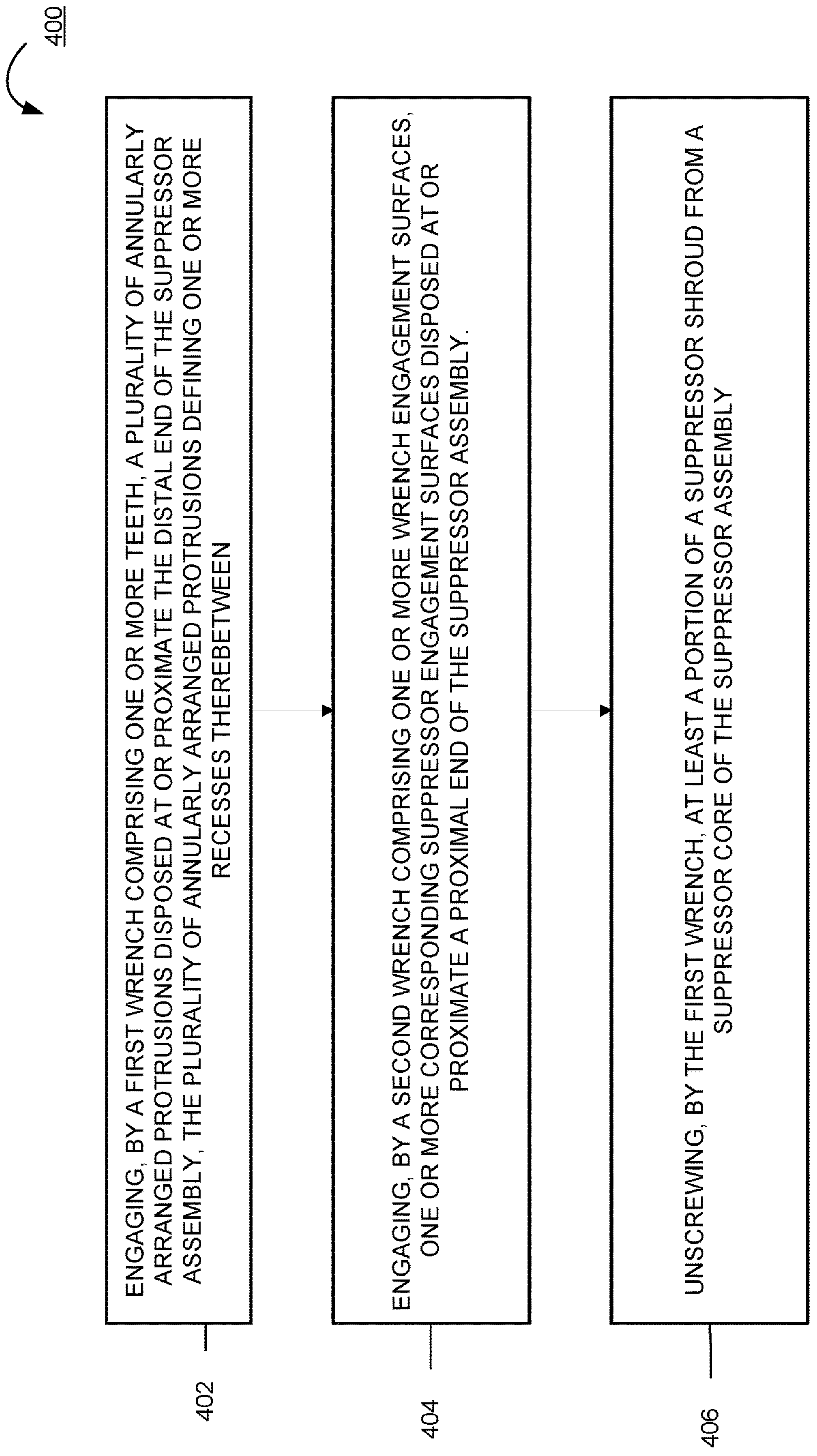
FIG. 14 is a flow chart illustrating an example method of disassembling a suppressor for a firearm in accordance with various embodiments of the present disclosure.
Figure 15:
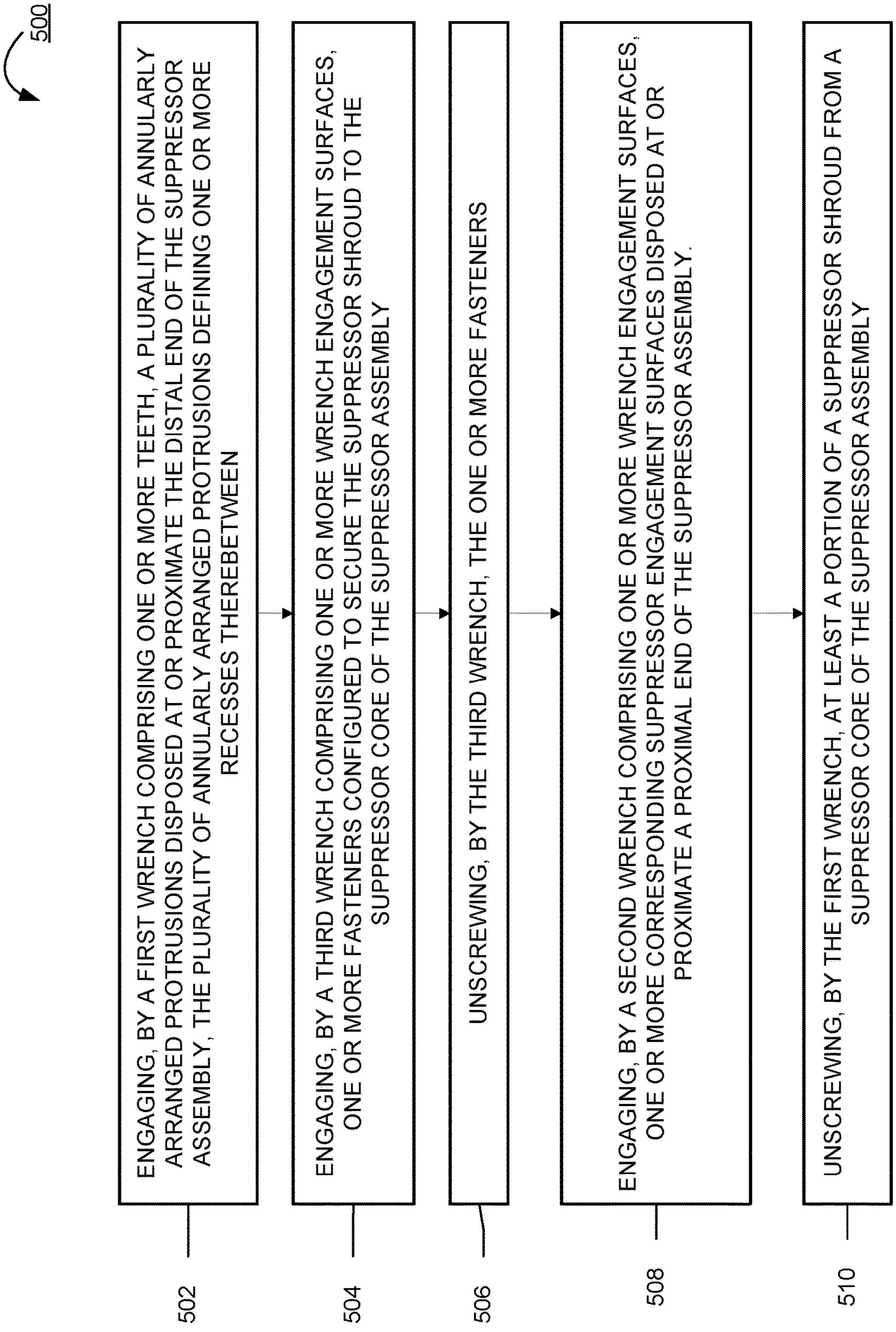
FIG. 15 is a flow chart illustrating an example method of disassembling a suppressor for a firearm in accordance with various embodiments of the present disclosure.

According to various embodiments, and as shown in FIGS. 13, 14, and 15, example methods 300, 400, and 500, respectively, are shown for assembling and/or disassembling a suppressor assembly for a firearm. FIGS. 5-12 similarly illustrate a sequence of disassembly for the suppressor assembly 100 of the firearm. Although the methods 300, 400, and 500 are described with reference to the suppressor assembly 100, the tool set 200, and their various components as previously described in this disclosure, the methods 300, 400, and 500 may be implemented using other assembly (ies), tool set(s), and components according to the various embodiments discussed herein.

Referring now to FIG. 13, in some embodiments, the method 300 may include a step 302 of engaging, by a wrench comprising one or more teeth, a plurality of annularly arranged protrusions disposed at or proximate the distal end of the suppressor assembly, the plurality of annularly arranged protrusions defining one or more recesses therebetween. A non-limiting example of step 302 is shown in at least FIG. 5.

In some embodiments, the method 300 may include a step 304 of unscrewing, by the wrench, at least a portion of a suppressor shroud from a suppressor core of the suppressor assembly. A non-limiting example of step 304 is shown in at least FIGS. 11 and 12.

Referring now to FIG. 14, in some embodiments, the method 400 may include a step 402 of engaging, by a first wrench comprising one or more teeth, a plurality of annularly arranged protrusions disposed at or proximate the distal end of the suppressor assembly, the plurality of annularly arranged protrusions defining one or more recesses therebetween. A non-limiting example of step 402 is shown in at least FIG. 5.

In some embodiments, the method 400 may include a step 404 of engaging, by a second wrench comprising one or more wrench engagement surfaces, one or more corresponding suppressor engagement surfaces disposed at or proximate a proximal end of the suppressor assembly. A non-limiting example of step 404 is shown in at least FIG. 10.

In some embodiments, the method 400 may include a step 406 of unscrewing, by the first wrench, at least a portion of a suppressor shroud from a suppressor core of the suppressor assembly. By way of example, the second wrench and the first wrench may torque the suppressor assembly in opposing directions (regardless of whether one of the wrenches remains stationary) to cause the suppressor shroud to unscrew or otherwise separate from the suppressor core. A non-limiting example of step 406 is shown in at least FIGS. 11 and 12.

Referring now to FIG. 15, in some embodiments, the method 500 may include a step 502 of engaging, by a first wrench comprising one or more teeth, a plurality of annularly arranged protrusions disposed at or proximate the distal end of the suppressor assembly, the plurality of annularly arranged protrusions defining one or more recesses therebetween. A non-limiting example of step 502 is shown in at least FIG. 5.

In some embodiments, the method 500 may include a step 504 of engaging, by a third wrench comprising one or more wrench engagement surfaces, one or more fasteners configured to secure the suppressor shroud to the suppressor core of the suppressor assembly. A non-limiting example of step 504 is shown in at least FIG. 6.

In some embodiments, the method 500 may include a step 506 of unscrewing, by the third wrench, the one or more fasteners. A non-limiting example of step 506 is shown in at least FIGS. 7-9.

In some embodiments, the method 500 may include a step 508 of engaging, by a second wrench comprising one or more wrench engagement surfaces, one or more corresponding engagement surfaces disposed at or proximate a proximal end of the suppressor assembly. In some embodiments, the second wrench may be engaged with the suppressor assembly (e.g., the suppressor core). In some embodiments, the second wrench may be engaged with the suppressor assembly before unscrewing the one or more fasteners. A non-limiting example of step 508 is shown in at least FIG. 10.

In some embodiments, the method 500 may include a step 510 of unscrewing, by the first wrench, at least a portion of a suppressor shroud from a suppressor core of the suppressor assembly. A non-limiting example of step 510 is shown in at least FIGS. 11 and 12.

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated, in light of the present disclosure, that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

The invention claimed is:

1. A method of disassembling a suppressor assembly for a firearm, the method comprising:

engaging, by a first wrench comprising one or more teeth, a plurality of annularly arranged protrusions disposed at or proximate a distal end of the suppressor assembly, the plurality of annularly arranged protrusions defining one or more recesses therebetween;

engaging, by a second wrench comprising an arced portion that comprises one or more wrench engagement surfaces, one or more corresponding suppressor engagement surfaces disposed at or proximate a proximal end of the suppressor assembly with the one or more wrench engagement surfaces of the arced portion of the second wrench; and unscrewing, by the first wrench, at least a portion of a suppressor shroud from a suppressor core of the suppressor assembly by applying opposing torques on the suppressor shroud with the first wrench and the suppressor core with the second wrench.

2. The method of claim 1, wherein the second wrench comprises an elongated bar defining:

a first portion that is substantially linear;

a second portion that is substantially linear; and the arced portion that comprises the one or more wrench engagement surfaces, wherein the arced portion is defined between the first portion and the second portion.

3. The method of claim 1, wherein the second wrench comprises an elongated bar defining:

a first portion that is substantially linear; and a second portion that is arced, wherein the second portion that is arced comprises the one or more wrench engagement surfaces of the second wrench, and wherein the method comprises engaging, by the second portion that is arced the one or more corresponding suppressor engagement surfaces.

4. The method of claim 1, further comprising engaging one or more fasteners that secure the suppressor shroud to the suppressor core of the suppressor assembly with one or more wrench engagement surfaces of a third wrench.

5. The method of claim 1, wherein the first wrench comprises a ring-shaped portion, and wherein the one or more teeth extend at least partially toward a radial center of the ring-shaped portion from an inner side of the ring-shaped portion.

6. The method of claim 1, wherein:

the suppressor core comprises one or more baffles, each of the one or more baffles defining an opening aligned along a linear projectile axis defined by the suppressor core, the suppressor shroud covers at least a portion of the suppressor core, and the suppressor shroud comprises the plurality of annularly arranged protrusions.

7. The method of claim 6, wherein the suppressor shroud comprises threading configured to engage corresponding threading of the suppressor core.

8. The method of claim 1, wherein the suppressor shroud comprises an end cap disposed at a distal end of the suppressor shroud, and wherein the end cap comprises the plurality of annularly arranged protrusions.

9. The method of claim 1, wherein the suppressor core comprises a plurality of suppressor engagement surfaces at or proximate the proximal end of the suppressor assembly, and wherein applying opposing torques on the suppressor shroud with the first wrench and the suppressor core with the second wrench comprises applying torque on the plurality of suppressor engagement surfaces of the suppressor core with the second wrench.

10. The method of claim 1, further comprising:

engaging, by a third wrench comprising one or more wrench engagement surfaces, one or more fasteners configured to secure the suppressor shroud to the suppressor core of the suppressor assembly; and unscrewing, by the third wrench, the one or more fasteners, wherein the one or more fasteners are aligned along a linear projectile axis defined by the suppressor core, wherein the one or more fasteners comprise one or more threaded nuts, and wherein threading of the suppressor shroud is configured to be disposed proximally of the one or more threaded nuts.

11. The method of claim 1, further comprising:

engaging, by a third wrench comprising one or more wrench engagement surfaces, one or more fasteners configured to secure the suppressor shroud to the suppressor core of the suppressor assembly; and unscrewing, by the third wrench, the one or more fasteners, wherein the one or more fasteners are disposed at or proximate the distal end of the suppressor assembly, and wherein the one or more fasteners are configured to be disposed radially inward of the plurality of annularly arranged protrusions relative to a linear projectile axis defined by the suppressor assembly.

12. A method of disassembling a suppressor assembly for a firearm, the method comprising:

engaging, by a first wrench comprising one or more teeth, a plurality of annularly arranged protrusions disposed at or proximate a distal end of the suppressor assembly, the plurality of annularly arranged protrusions defining one or more recesses therebetween;

engaging, by a second wrench comprising one or more wrench engagement surfaces, one or more corresponding suppressor engagement surfaces disposed at or proximate a proximal end of the suppressor assembly;

unscrewing, by the first wrench, at least a portion of a suppressor shroud from a suppressor core of the suppressor assembly by applying opposing torques on the suppressor shroud with the first wrench and the suppressor core with the second wrench;

engaging, by a third wrench comprising one or more wrench engagement surfaces, one or more fasteners configured to secure the suppressor shroud to the suppressor core of the suppressor assembly; and unscrewing, by the third wrench, the one or more fasteners.

13. The method of claim 12, wherein the second wrench comprises an arced portion that comprises one or more wrench engagement surfaces that engage the one or more corresponding suppressor engagement surfaces.

14. The method of claim 13, wherein the second wrench comprises an elongated bar defining:

a first portion that is substantially linear;

a second portion that is substantially linear; and the arced portion that comprises the one or more wrench engagement surfaces, wherein the arced portion is defined between the first portion and the second portion.

15. The method of claim 12, further comprising engaging one or more fasteners that secure the suppressor shroud to the suppressor core of the suppressor assembly with one or more wrench engagement surfaces of a third wrench.

16. The method of claim 12, wherein the first wrench comprises a ring-shaped portion, and wherein the one or more teeth extend at least partially toward a radial center of the ring-shaped portion from an inner side of the ring-shaped portion.

17. The method of claim 12, wherein:

the suppressor core comprises one or more baffles, each of the one or more baffles defining an opening aligned along a linear projectile axis defined by the suppressor core, the suppressor shroud covers at least a portion of the suppressor core, and the suppressor shroud comprises the plurality of annularly arranged protrusions.

* * * * *